(12) United States Patent
Paparoni

(10) Patent No.: US 6,301,992 B1
(45) Date of Patent: Oct. 16, 2001

(54) ADJUSTMENT AND ASSEMBLY SYSTEM FOR MECHANICAL CABLE REMOTE CONTROL

(76) Inventor: Paolo Paparoni, Av. Humberto A.C. Branco, 860, São Bernardo do Campo-Sp-CEP 098750-300 (BR)

(*) Notice: Subject to any disclaimer, the term of this patent is extended or adjusted under 35 U.S.C. 154(b) by 0 days.

(21) Appl. No.: 09/359,177

(22) Filed: Jul. 22, 1999

(51) Int. Cl.[7] .................................................. F16C 1/22
(52) U.S. Cl. ................................................... 74/502.6
(58) Field of Search .......................... 74/500.5, 501.5 R, 74/501.6, 502, 502.2, 502.6

(56) References Cited

U.S. PATENT DOCUMENTS

| | | | |
|---|---|---|---|
| 4,884,467 | * 12/1989 | Martell | 74/501.5 R |
| 5,222,413 | * 6/1993 | Gallas et al. | 74/501.5 R X |
| 5,511,442 | * 4/1996 | Tame | 74/502.6 |
| 5,709,132 | * 1/1998 | Irish et al. | 74/502.6 X |

FOREIGN PATENT DOCUMENTS

4135309-A1 * 4/1993 (DE).

* cited by examiner

Primary Examiner—Rodney H. Bonck
Assistant Examiner—Ankur Parekh
(74) Attorney, Agent, or Firm—Steinberg & Raskin, P.C.

(57) ABSTRACT

An adjustment and assembly system for mechanical cable remote control of the type in which the transmission of control between a transmitting mechanical element and a receiving mechanical element is made through a flexible transmission cable, and in which the adjustment of the system is achieved by regulating the effective length of the transmission cable by adjusting the position of a dented pin coupled to the end of the cable which fits in the corresponding dented profile made in the inner edges of an oblong hole located in the receiving mechanical element.

9 Claims, 2 Drawing Sheets

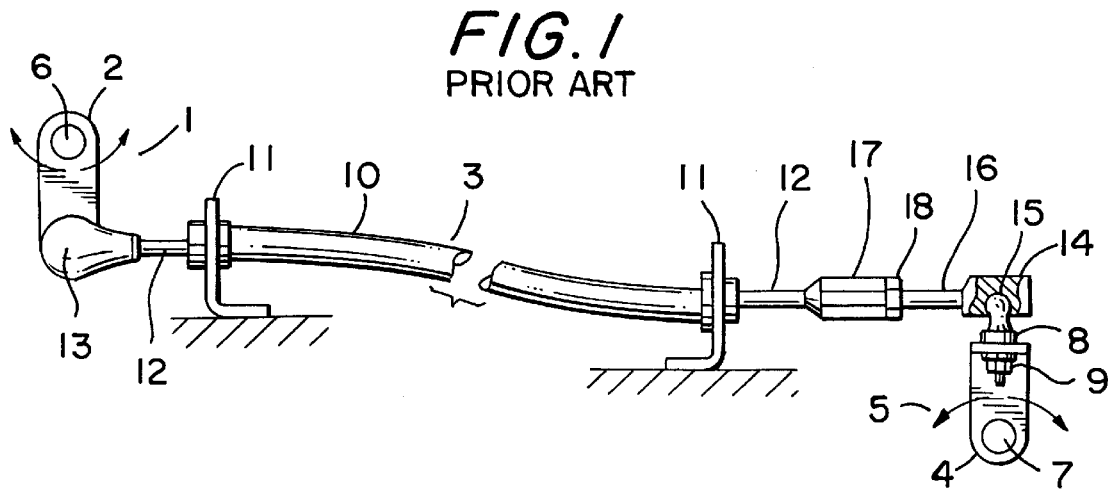
FIG. 1
PRIOR ART
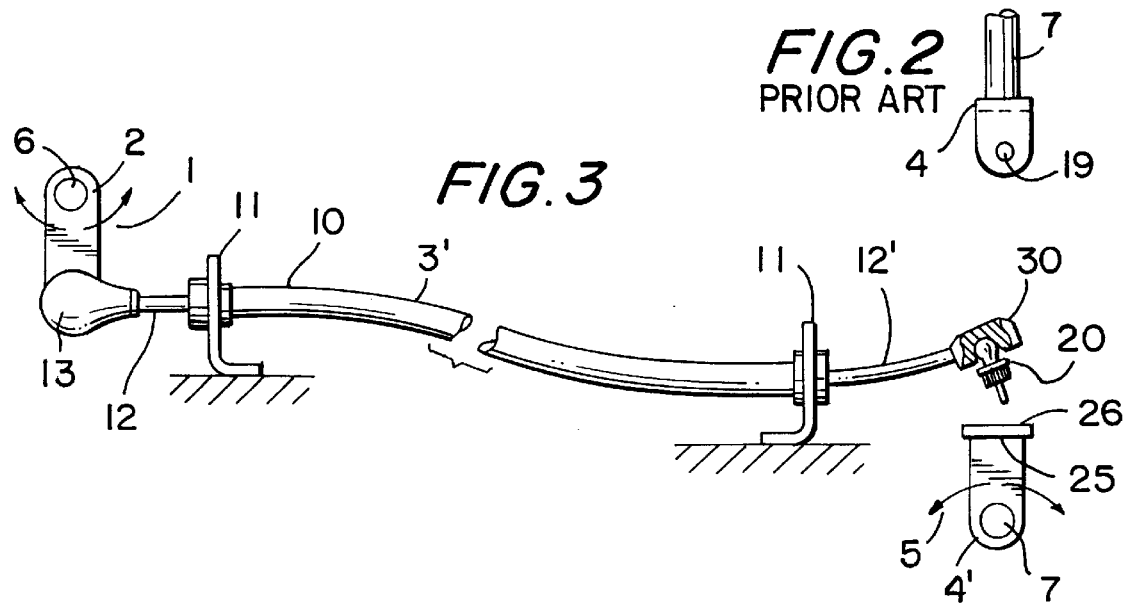
FIG. 2
PRIOR ART
FIG. 3
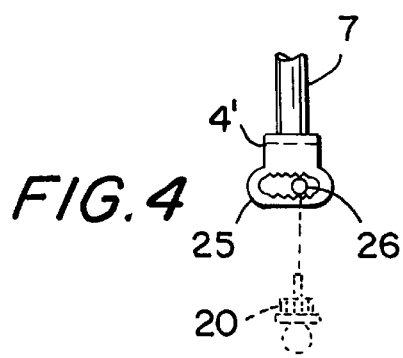
FIG. 4

ADJUSTMENT AND ASSEMBLY SYSTEM FOR MECHANICAL CABLE REMOTE CONTROL

FIELD OF THE INVENTION

The present invention relates to an adjustment and assembly system for a mechanical cable remote control where the transmission of movements and of control forces between a transmitter mechanical element and a receiver mechanical element is made through a transmission cable; and in particular to a system in which the adjustment and assembly are made simultaneously by a dented pin at one end of the cable, which pin fits in to a corresponding dented profile made in the inner edges of an oblong hole located at the end of one of the mechanical elements connected by the cable, in such a way that the pin positions itself in the best position with respect to the oblong hole, thereby facilitating the assembly.

BACKGROUND OF THE INVENTION

It is known that, when a control movement has to be transmitted, with a given force, between mechanical elements which are separated or apart from one another, a flexible cable is used which allows the precise transmission of movements and of control forces, even in sinuous routes.

Utilization of remote control cables for the transmission of data and forces are frequently found in the mechanical industry. For example, in the automotive industry, cables are traditionally used to transmit forces between elements which are spaced from one another, such as in an engine, the control forces of an accelerator pedal and a clutch pedal and to transmit the control forces of a gear lever to a gear box.

A transmission cable which allows the transmission of reciprocal movements in two directions (i.e., push-pull type) comprises a flexible internal cable which allows for the transmission of tension and compression forces, and a flexible outside shield or sheath in which the cable slides with minimum play. The constant linear dimension of the two elements along the axis of the cable determine the precision of the transmission of movement of the cable.

Normally terminals are provided at the two ends of the internal cable, the terminal permits for an articulated connection to a movement transmitter and to a movement receiver element meanwhile, the two ends of the flexible outside cover have means to thereby fix a respective end of the flexible outside cover to the supports of the respective element.

Due to the structure and under the action of stresses and the wear of the materials caused by variation of temperature. In use, the inner cable and the outer sheath are subject to small plastic deformations caused by the stress acting on the ends of the cable and the wear of the material caused by temperature variations, which change the length of the elements. In addition, the relative distance between the mechanical elements interconnected by the transmission cable is subject to changes in tolerances of the whole set of components and of the supports existing between the elements, which may not be previously and precisely determined.

The effects of the above mentioned factors create the need of a system which allows the regulation of the cable length upon the assembly and during the whole useful life thereof, in order to compensate the variations of length during the use.

For such purposes, transmission cables having an adjustment system to adjust the length thereof are used. The adjustment system comprises a male and female thread system, with tightening lock nuts located in the terminal ends of the cable. The regulation is made by loosening the thread at the terminal of the cable, fixing the position of the cable and then tightening the lock nut.

A male/female threaded adjustment system is difficult to use because access to the system is frequently difficult. The adjustment of the nut, especially the tightening of the lock nut in a male/female threaded adjustment system typically, requires the use of two tools, and the access of the operator hands is limited within the existing space, which makes such adjustment quite complex, time consuming and imprecise.

In addition, safe operation of the vehicle is difficult to achieve since it is uncertain whether the lock nut has been tightly screwed on.

SUMMARY OF THE INVENTION

Therefore, there is a need for a system to adjust the length of the cables and to connect them to the respective mechanical elements in a fast and sure way, which also offers a guaranty against the possibility of the connections becoming loose.

The solution submitted herein is a system in which the adjustment is made by a dented pin mounted at the end of the cable, which fits in the corresponding dented profile made in the internal edges of an oblong hole located in the end of one of the mechanical elements connected by the cable thereby preventing the connections from becoming loose.

According to the present invention, upon the assembly of the control transmitting mechanical element and of the corresponding receiving mechanical element, with the transmission cable already installed and connected to one of the elements, the dented pin attached to the free end of the cable is automatically close to the dented oblong hole of the mechanical element in which the pin is to be assembled, in a position which, due to the hole size, is always in along the length of the dented portion of the oblong hole.

In this the operator can now easily fit, with one single hand, the dented pin within the oblong hole of the element to be connected, thereby always remaining in the correct adjusting position between the mechanical elements. The tightening of the nut which fixes the dented pin within the element is also facilitated, for since the dented pin fits within the dented portion of the oblong hole, the pin is prevented from turning and, therefore, the tightening operation of the nut requires the use of a single tool, and may be performed by a single hand.

It is an object of the present invention to provide a system which allows for the adjustment and assembly of the system with a single hand and one single tool.

It is yet another object of the present invention to provide for a fast adjustment in that, once the mechanical elements to be connected are located, it is only necessary to fit the pin in the dented hole.

It is a further object of the present invention to make it always possible to see that the pitch of the dent in the pin and in the oblong hole is less than the acceptable positioning error.

It is another object of the present invention to permit the possibility of also inserting an adjustment system, where necessary.

The advantages of the system with respect to the prior art, namely, the usual system of adjustment with threads, are quite evident.

The adjustment becomes automatic and simultaneous to the assembly. The fitting of the dents or teeth eliminates the possibility of slackening, and the consequent plays and loss of adjustment, which is a natural fact with a threaded adjustment when subject to a constant vibration. The tightening of the nut of the dented pin requires a single wrench, and the torque is quite easily controlled by the operator, who uses one single hand to assemble and to tighten the nut.

In addition to the above mentioned advantages, the present invention allows for the use of simple cables, without the need for a threaded adjustment system. Simple cables are more compact and quite economical.

As a result, greater simplicity, speed and safety in the assembly and adjusting operations of the system is achieved, with a consequent reduction in cost. One of the best practical results is that the system allows for adjustment in tight places with greater safety than prior systems.

BRIEF DESCRIPTION OF THE DRAWINGS

The characteristics, purposes and advantages of the system of this invention shall become clearer through the detailed description of the attached drawings which represent, in an illustrative but not limiting in any way, the construction of an assembly and adjustment system of a cable transmission system in which:

FIG. 1 represents the cable transmission control between two mechanical elements, showing the prior art system normally used to regulate the length of the cable;

FIG. 2 is an upper view of the end of the receiving mechanical element of FIG. 1;

FIG. 3 represents the same transmission system of FIG. 1, in which the new adjustment and assembly system according to the present invention for a transmission system is applied;

FIG. 4 is an upper view of the end of the receiving mechanical element of FIG. 3, according to the present invention;

DETAILED DESCRIPTION OF THE INVENTION

Figure 5:
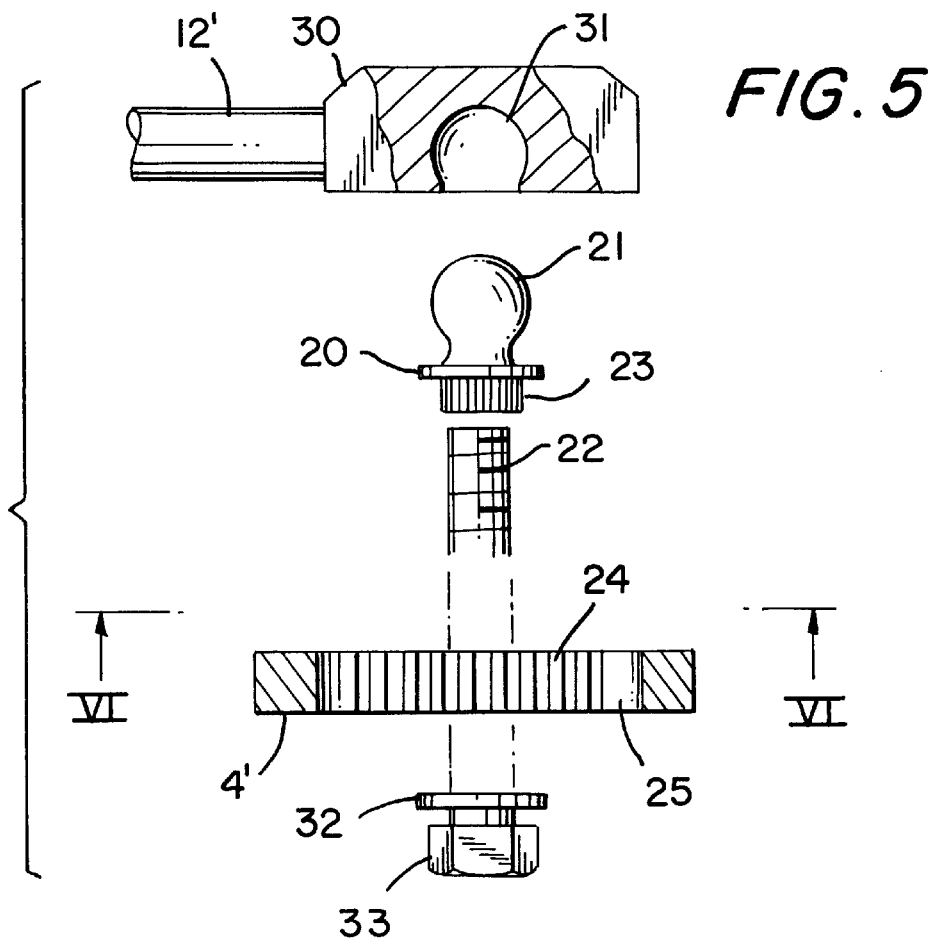
FIG. 5 is an exploded view of the elements of the articulated joint between the terminal of the transmission cable and the movement receiving element, showing, in detail the adjusting and assembly elements which are characteristics of this invention.

In a more specific reference to the drawings, FIG. 1 shows how a turning movement of control 1, of the transmitting mechanical element 2, may be transmitted through the transmission cable set 3 to the receiving mechanical element 4, therefore causing the rotation 5 thereof In the example shown in FIG. 1, the transmitting mechanical element 2 is an arm connected to an axis 6 and the receiving mechanical element 4 is an arm bent as an angle piece connected to the axis 7. We should note that the rotation plains of elements 2 and 4 may have different positions in the space, and not only the one represented in FIGS. 1 and 3.

On the side of the angle piece, namely, at the upper end of the arm 4, a hole 19 receives a joint pin 8 which has a threaded bar which enters the hole and which is fixed to the arm 4 by a nut 9.

The transmission cable set 3 represented in FIG. 1 is of adjustable type and is constituted by an outside flexible cover of sheath 10, the ends of which are attached to the equipment through supports 11 and an inner flexible cable 12, at the ends of which are fixed terminals 13 and 14 which move, respectively, at the ends of the transmitting element 2 and of the receiving element 4.

In order to allow for the adjustment of the length of the inner cable 12, one of the terminals, which in the this case is terminal 14, has an adjustment system formed by a threaded rod 16 threadingly received in a threaded busing 17 attached to the end of the internal cable 12. A lock nut 18 is tightened at the end of the adjusting, against the threaded bushing 17, in order to fix the adjustment length of the inner cable 12.

It should be noted that the actual length of the cable 12 is not physically changed. Rather by adjusting the position of the threaded rod 16 the "effective length" of the cable is adjusted. Thus the term "effective length" should not be interpreted to mean an actual physical change in the length of the cable. Rather it is only and effective length of the cable that is adjusted by adjusting the position of the threaded rod.

The freedom of rotation and oscillation of the two ends of the transmission cable 12 with respect to the transmitting element 2 to the receiving element 4 is assured by the joints of the terminals 13 and 14 which, in the shown configuration, are each comprises a joint pin 8 with spherical head which is fixed to the respective element 2 or 4, and a spherical seat 15 which is an integral part of the respective terminal 13 or 14 (i.e., a ball and socket joint). It would be obvious to one skilled in the art to substitute a different joint assembly, such as a cylindrical pin for the joint 13.

The adjustment of the system of FIG. 1 is performed by placing the transmitter element 2 and the receiving element 4 in their respective neutral positions, (i.e., which in the case of FIGS. 1 and 3 are the central positions shown in the elements), and adjusting the length of the inner cable 12. The adjustment is normally carried out by tightening or loosening the threaded rod 16 of the terminal 14 within the threaded bushing 17, fixed to the inner cable 12, until the threaded rod of the joint pin 8 enters loosely in the hole 19 opened in the end of element 4. The lock nut 18 is then tightened against the threaded busing 17 in order to lock in place the performed adjustment.

Once the length of the inner cable 12 is adjusted, the pin 8 is fixed to the receiving arm element or element 4 by introducing the threaded end of the pin 8 into, the hole 19 and then placing and tightening the nut 9 on to the pin 8.

It should be noted that the above mentioned adjustment require a given time to adjust the length of the cable, and another time to tighten the lock nut 18 on the threaded bushing 17. The tightening requires two wrenches operated in opposite direction. The tightening of the nut 9 and the pin 8 requires also two opposite wrenches, since before the tightening the pin rotates freely within the hole 19 and within the spherical seat 15. All adjusting operations described above require the action of both hands of the operator.

The system according to the present invention, as shown in FIGS. 3 to 6, eliminates the problems associated with adjusting which exist in the assembly according to FIG. 1. In FIG. 3 the transmission cable 3' with the inner cable 12', are of the simple type, of a fixed length. The transmitting element 2 and the terminal 13 with the joint do not change from those shown and described with regard to FIG. 1. However, the receiving arm 4 and the pin 8 of FIG. 1 were replaced, respectively, by a receiving element 4' and a pin 20 according to the present invention.

In FIGS. 3 and 4 the terminal 30 with the new pin 20 fitted therein are shown in the act of being assembled in the new receiving element or arm 4'. It is possible to notice that when the transmitting element 2 and the receiving element 4' are in their central or neutral positions, the cable 12', when free, places itself naturally with its pin 20 in any point 26 of the length of an oblong hole 25 of the arm 4', which has replaced the hole 19 of the arm 4.

Figure 6:
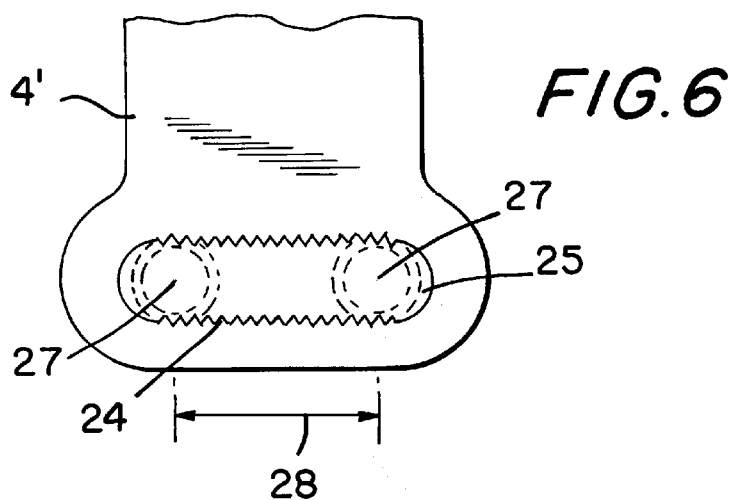
FIG. 6 is the view of the end of a receiving element, as per view VI—VI of FIG. 5, showing in details the dented oblong hole according to the present invention.

As shown in FIGS. 5 and 6, the new pin 20, plus the sphere 21 and the threaded portion 22 which are in the prior pin 8, has a knurled or dented portion 23, the teeth of which will fit in the corresponding knurl or dented portion 24 of the inner surface of the oblong hole 25, located at the end of the new receiving element 4'.

The knurled or dented circular portion 23 of the new pin 20 may fit into any point of the knurled or dented portion 24 of the oblong hole 25. In FIG. 6 there are, shown in dotted lines, the extreme positions 27 in which the pin 20 may be positioned and the distance between the two extreme positions 27 represents the useful length 28 of the knurled portion 24.

The correct point of fit of pin 20 in the hole 25 will depend on the differences which are in each assembly, between the length of the transmission cable 3' and the corresponding distance for the assembly of the devices in which there are assembled, respectively, the transmitting element 2 and the receiving element 4' of the control. The useful length 28 of the knurled or dented portion 24 is dimensioned in order to be longer than most differences in length actually found.

As shown in FIGS. 3 and 4, upon the assembly, the first parts to be mounted to the devices include, respectively, the transmitting element 2, having the transmission cable 3' pre-installed thereto, and the receiving element 4'. The elements 2 and 4' are then placed in their respective neutral positions. In this condition, the inner cable 12' will be naturally fitted in such a way that its terminal 30 is close to the end of the receiving arm 4'.

The pin 20, having the sphere 21 already fitted into the terminal 30, will also close to the oblong hole 25, in a position and in a distance which corresponds to the neutral position of the receiving element 4', which permits the proper fitting of the dents 23 into the dents 24 thereby ensuring that the ducts 23 and 24 are in the proper adjusted position.

It is therefore easy for an assembler to unite, directly, with one single hand, the terminal 30 of the inner cable 12' with the end of the arm or receiving element 4' in the correct adjusting position. With the dented pin 20 prevented from turning, due to the fitting of the teeth, it is easy for the assembler to place a washer 32 and a tightening nut 33 on to the threaded portion 22 of the dented pin 20, and to tighten the nut with a single wrench, using one single hand. This ease of handling simplifies the service in places which are tight and difficult to access.

The safety of the system herein submitted is assured by the fact that, due to the fitting of the teeth, there is no possibility of loosening and loss of regulation of the length of the cable, a fact which is present when we use the traditional adjustment by thread.

The adjusting system of this invention allows the use of transmission cables with fixed length which are simpler and more economical and safe. FIG. 5 shows how the end of the internal cable 12' is fixed directly to the terminal 30. In the spherical joint shown in this example, the spherical seat 31, which fits the terminal 30, receives the spherical head 21 of the new dented pin 30.

By the above, it becomes clear that the new characteristics submitted in this invention facilitate the assembly and regulation of the whole mechanical transmission of control through cables, specially in conditions of difficult access of the elements connected by the cable, offer more safety in the operation of the control system, and allow a significant reduction in time and costs of labor and material.

It is known that the solution submitted may suffer changes and variations in its form of construction, provided they do not change the purposes of the invention, mentioned in the claims below.

What is claimed is:

1. An adjustment and assembly system for mechanical cable remote control of the type in which the transmission of controls between a mechanical transmitter element and a mechanical receiving element is performed through a flexible transmission cable, and in which the adjustment of the system is achieved by regulating an effective length of the transmission cable, the system comprising:

a pin (20) having a circular serrated or dented portion (23), located between a jointed head (21) and a threaded rod (22) of the pin (20), a terminal (30) coupled to an end of said transmission cable (3') structured and arranged for receiving said jointed head (21) of said pin;

a mechanical receiving element (4') having an oblong serrated or dented hole (25) structured and arranged to receive said circular serrated or dented portion (23) of said pin at any one of a plurality of selected locations within said oblong serrated or dented hole (25), whereby upon the assembly of the system, the pin (20) may be arranged in the oblong serrated or dented hole of the mechanical receiving element (4') at any one of plurality of selected locations to thereby enable the adjustment of the effective length of the transmission cable (3').

2. An adjustment and assembly system for mechanical cable remote control according to claim 1, wherein said oblong serrated or dented hole (25) has a useful length and wherein said useful length is of a sufficient length to enable the adjustment of said effective length of said transmission cable (3').

3. An adjustment and assembly system for mechanical cable remote control according to claim 1, wherein the transmission cable (3') comprises an inner transmission cable (12') having a length and a first end coupled to said mechanical transmitter element and a second end coupled to said mechanical receiving element and whereby the effective length of said inner transmission cable (12') is adjusted upon the arrangement of the pin (20) within the oblong serrated or dented hole of the mechanical receiving element (4').

4. An adjustment and assembly system for mechanical cable remote control according to claim 1, wherein the serrated or dented portion (23) of the pin (20) have a plurality of teeth having a selected pitch, and wherein said oblong serrated or dented hole (25) has a plurality of teeth structured and arranged to cooperate with said plurality of teeth of said pin (20) and wherein said selected pitch is such that it enables the precise adjustment of said system.

5. An adjustment and assembly system for mechanical cable remote control wherein the adjustment of said system is achieved by regulating an effective length of the transmission cable, the transmission cable being of the type which transmits controls between a transmitter mechanical element and a receiving mechanical element, said system comprising:

a terminal coupled to an end of the transmission cable;

mechanical element having a serrated or dented opening formed therein; and a pin, said pin comprising:
- a head structured and arranged to be coupled to said terminal;
- a threaded rod coupled to said head;
- means for fitting said threaded rod in the serrated or dented opening of said mechanical element so that said pin is able to be fixed in any one of a plurality of locations within said serrated or dented opening of said mechanical element thereby enabling adjustment of the effective length of the transmission cable.

6. The adjustment and assembly system for mechanical cable remote control according to claim 5 wherein said means for fitting said threaded rod in the serrated or dented opening of said mechanical element comprises a serrated or dented portion located between said head and said threaded rod.

7. The adjustment and assembly system for mechanical cable remote control according to claim 5 wherein:
- the serrated or dented hole formed in the mechanical element is oblong and has a length sufficient to enable the adjustment of said effective length of said transmission cable.

8. The adjustment and assembly system for mechanical cable remote control, as in claim 5, said transmission cable further comprising:
- an outer sheath;
- an inner transmission cable slidably positioned within the outer sheath, the transmission cable having a length and a first end coupled to said mechanical transmitter element and a second end coupled to said mechanical receiving element such that the length of said inner transmission cable is adjustable; and
- wherein an adjustment of said effective length of said inner transmission cable is effectuated upon the fixing of said pin in any one of a plurality of locations within said serrated or dented opening of said mechanical element.

9. The adjustment and assembly system for mechanical cable remote control according to claim 6 wherein each of said serrated or dented portion of said pin and said serrated or dented opening of said mechanical element has teeth and wherein the teeth of said mechanical element and the teeth of said pin each have a selected pitch to thereby enable the precise adjustment of the system.

* * * * *